US005827581A

United States Patent [19]

Cobb et al.

[11] Patent Number: 5,827,581

[45] Date of Patent: Oct. 27, 1998

[54] DECORATIVE PLAQUE AND FORMING METHOD

[75] Inventors: Dwayne A. Cobb, Lexington; Steven A. Tomlin, Winchester, both of Ky.

[73] Assignee: Hunter Manufacturing Group, Inc., Lexington, Ky.

[21] Appl. No.: 800,351

[22] Filed: Feb. 14, 1997

[51] Int. Cl.[6] .......... B44C 5/04; G02B 5/08

[52] U.S. Cl. .......... 428/13; 156/89; 156/230; 428/542.4; 428/912.2; 428/913.3

[58] Field of Search .......... 428/13, 913.3, 428/542.4, 912.2; 156/89, 230

[56] References Cited

U.S. PATENT DOCUMENTS

| | | | |
|---|---|---|---|
| 3,791,841 | 2/1974 | Carmellini et al. | 428/40.9 |
| 3,857,746 | 12/1974 | Blanco et al. | 156/89 |
| 5,013,592 | 5/1991 | Culpepper | 428/46 |
| 5,128,194 | 7/1992 | Sorko-Ram | 428/38 X |
| 5,397,410 | 3/1995 | Handly | 156/89 |

*Primary Examiner*—Henry F. Epstein

*Attorney, Agent, or Firm*—King & Schickli

[57] ABSTRACT

A method of forming a decorative plaque includes the steps of providing a transparent sheet, printing a decalcomania in a multi-color process having a reverse pattern layer with open spaces and applying the pattern layer on the back of the sheet for viewing of the pattern from the front. A contrasting layer is deposited behind the pattern layer to cover at least the open spaces so as to be distinctive when viewed from the front. A protective backing is applied behind the contrasting layer. After applying the decorative pattern by wetting and sliding into position, the assembly is heated in a kiln to approximately 1130° F. in order to melt the glass frit and fuse the pattern layer into the sheet. The deposition of the contrasting layer is performed at a temperature low enough not to remelt the glass frit. In one embodiment, a silvering solution makes the spaces reflective to form a decorative mirror. The backing is provided using scratch resistant paint. The plaque/mirror of the invention includes a transparent sheet, a reverse pattern layer with open spaces from a decalcomania on the back of the sheet and a contrasting/silver layer within the spaces to make them distinctive and viewable from the front. The ink forming the pattern layer is fritted and is fused into the back of the sheet.

17 Claims, 3 Drawing Sheets

DECORATIVE PLAQUE AND FORMING METHOD

TECHNICAL FIELD

The present invention relates to a method of forming a decorative plaque and the finished plaque formed by said method, and more particularly, to a forming method and decorative plaque, which may in one embodiment be a decorative mirror, characterized by the novel use of a decalcomania.

BACKGROUND OF THE INVENTION

A popular form of memorabilia for favorite sports teams, individual celebrities, company logos and the like is a decorative plaque adapted to be hung on the wall, such as in a sports bar, business setting or in the home. For example, in a sports bar setting, a plaque memorializing a baseball, football or other sport team is a very popular decoration. For a home setting, a plaque in a family room or den can take the form of a simulated stain glass window or the like. The most popular plaques are characterized by patterns of bright colors featuring sports or business logos, geometric designs, trademarks identifying various products or the like, or simply a mosaic of random shapes.

In one form of the plaques that are now popular, parts of the pattern are reflective so that an intriguing type of mirror is formed. A viewer looking into the mirror sees the pattern, and in the background sees him or herself and the surrounding area. The reflective surfaces forming the mirror portions not only provide such an intriguing composite view for the beholder, but through the reflected light can actually brighten and seemingly enlargen the room, thus adding an additional dimension to the display.

In the past, these types of plaques and mirrors have been typically silk-screen printed on the face of a transparent sheet, such as glass or acrylic, which leaves the pattern subject to being scraped or rubbed off over time, either accidentally, or due to vandalism. In addition, the silk-screening process is labor intensive and relatively slow in that each color must be applied separately, which runs up the cost of production. Furthermore, performing the printing process is inherently difficult and tedious when it comes to registering the colors. Unless a very skilled operator is involved in doing the printing, there is also a tendency to smear the colors. These problems contribute to running the cost of production of the plaques/mirrors even higher due to the high scrap rate. A typical prior teaching of this silk-screening approach is shown in the U.S. Pat. No. 5,128,194, issued Jul. 7, 1992.

Another approach that has been tried in the past is to use a colored, semi-transparent film to assist in forming the multi-color pattern, such as shown in the U.S. Pat. No. 5,013,592, issued May 7, 1991. While this approach has also found some acceptance, the placement of the colored film is also a very difficult and tedious. Thus, with this method there is also much left to be desired in terms of providing an economical way of producing the plaques in large enough numbers and with minimum wastage to make it economical. Not only is the registration of the colors just as difficult when film is used, but the film has the tendency to form air bubbles that show up as blotches on the finished product.

Accordingly, an advance in the art of making decorative plaques and mirrors is needed. In particular, an approach for mass production in order to lower the cost of the finished products has been a significant goal for some time. Of equal significance is the need for a production method, and the resulting product, that features a decorative pattern of exceptionally high resolution.

SUMMARY OF THE INVENTION

It is thus a primary object of the present invention to provide a method of forming a decorative plaque, including decorative mirrors, and the finished product produced thereby, that overcomes the shortcomings of the prior art.

It is another and related object of the present invention to provide such a method and decorative plaque that is economical to produce in large numbers providing substantial economies in terms of mass production.

It is another and related object to provide such a method, and the byproduct of the method in a form of a plaque/mirror, that is characterized by high resolution in the pattern including perfect registration, absence of smearing and/or bubbles in the design.

It is still another object of the present invention to provide a decorative plaque/mirror that makes a novel use of multi-color printing of a decalcomania, which is then easily applied to the back of the transparent sheet, overlaid by other layers behind the pattern layer and finished with a protective backing, in a manner not heretofore available.

In accordance with the purposes of overcoming the prior shortcomings as described, a novel and improved method of forming a decorative plaque is thus provided. The plaque made by the method is particularly designed for sports and related memorabilia, as well as for more traditional uses, such as simulated stain glass or mosaic plaques that are used in the home. In a preferred application of the method, as well as the resulting product, the decorative plaque takes the form of a mirror.

The method is characterized by the steps of providing a transparent sheet having a front and a back, separately printing a decalcomania having a reverse pattern layer on a substrate, with the pattern layer having open spaces, applying the pattern layer to the back of the transparent sheet for viewing of the pattern from the front of the sheet and depositing a contrasting layer behind the pattern layer to cover at least the open spaces. A protective backing is provided behind the contrasting layer of the plaque. It should be noted that the word transparent is used herein to define a clear sheet, as well as something that is less than clear, but still has a see-through or translucent property. Also, while glass is a preferred sheet for forming the decorative plaque of the present invention, it is also understood that other forms of sheet, such as acrylic sheet, can be used.

The decorative plaque of the present invention can be easily made by use of the inventive method, which does away with the laborious and tedious steps of printing directly on a transparent sheet, either by silk-screen printing or other known processes. By using a decalcomania to apply the pattern layer on the transparent sheet, a high speed multi-color press can be used to form the decalcomania with perfect registration and without smearing. The registration is maintained during transfer of the pattern layer to the back of the transparent sheet of the plaque. Preferably the transfer is accomplished by simply wetting the decalcomania and sliding the pattern layer onto the back of the sheet. In doing so, a pattern of high resolution is formed, that is more attractive and appealing to purchasers of the product.

Further in accordance with the method, a high speed four color offset printing press, or equivalent multi-color press, is used to print the multi-color decalcomania. Also, to provide permanent attachment of the pattern layer on the glass sheet, and to make the design even more appealing, the inks are mixed with glass fritting, that is powder-like glass particles. After drying at a low temperature that is insufficient to melt the frit, the decalcomania is wetted and the pattern layer of the multi-color ink easily slides into position on the sheet. Once the pattern layer is in place, heat is applied, preferably between the temperatures of 1060° F. and 1200° F. (approximately 1130° F.), so as to melt the fritting and fuse the pattern layer into the back of the glass sheet. This heating step is preferably carried out in the confines of a kiln. Oxides in the fritting serve to enhance the vibrance of the colors.

As the next step, the deposition of the contrasting pattern layer is performed by spray coating to the back of the sheet at a temperature in the range of 350° F.–400° F. This contrasting layer covers at least the open spaces in the pattern layer formed by the decalcomania. The temperature of this step of the process is not high enough to remelt the grass frit in the pattern layer.

When a mirror is being produced, the contrasting pattern layer is silver thus making the spaces reflective. Preferably a silver nitrite solution is used by spraying on the back of the decalcomania pattern layer. The backing layer is then sprayed onto the back of the silvering after it has dried. The backing preferably takes the form of standard, scratch resistant paint.

The plaque of the present invention and made by the above inventive method, includes a transparent (or translucent) sheet with a pattern layer formed by a transferred decalcomania on the back thereof. The pattern layer of the decalcomania has open spaces through which a contrasting layer behind the pattern layer shows through, and is viewable from the front of the plaque. This decorative pattern, that is a combination of the decalcomania pattern layer and the contrasting layer, displays a composite, high resolution decorative pattern that is very attractive, in addition to being economically formed. Preferably, the plaque is multi-color and the color ink from the decalcomania is fritted so that once it is fired in place it is actually fused onto the back of the sheet. In the instance where the plaque takes the form of a mirror, the contrasting layer is formed by a liquid silver nitrite solution being sprayed over the back of the pattern layer, thus making the spaces reflective within the pattern and contributing to the distinctiveness of the finished product. A scratch resistant paint protects the embedded pattern layer of the plaque/mirror.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serves to explain the principles of the invention. In the drawings.

DETAILED DESCRIPTION OF THE INVENTION

Figure 1:
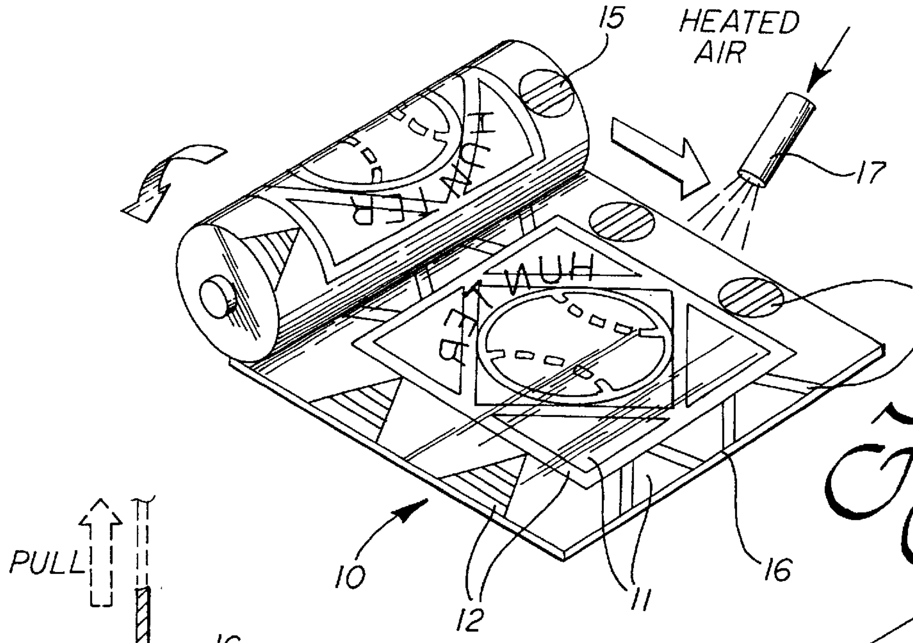
FIG. 1 is a perspective view from above and to the left showing a multi-color printing roller producing a decalcomania having a reverse pattern layer with open spaces on a paper substrate.
Figure 2:
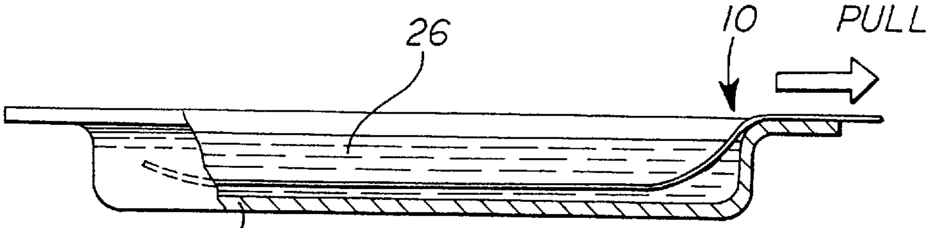
FIG. 2 is a side view of a representative open pan of water demonstrating in principal the wetting of a decalcomania to allow the pattern layer to slide off of the substrate.

With reference now to FIGS. 1 and 2 of the drawings, a more detailed description and explanation of the method of forming a decorative plaque in accordance with the present invention can be provided. In FIG. 1, the printing of a decalcomania 10 is illustrated in schematic form. It includes a printed pattern, depicted by the reference numeral 11, with open spaces 12 distributed throughout the pattern. As illustrated, this particular pattern is representative of a sports memorabilia including a baseball 13 in the center surrounded by a pattern of geometric shapes. It is to be understood that this type of pattern is simply representative of one form of the invention that is being described; with other popular patterns, such as depicting celebrities, company logos, mosaics or simulated stain glass, or even random patterns, also being within the concepts of the present invention.

It is contemplated that a typical, high speed multi-color printing step is used to print the decalcomania 10, and to illustrate this concept, a printing roller 15, which can be from a standard four-color or multi-color press, is depicted. The pattern layer is printed on a substrate 16 (see also FIG. 3) that is typically in sheet form. As illustrated, the roller 15 is driven and the sheet moves through the printing press (see the action arrows in this figure). The ink being applied, which is of a particular character as will be described below, may be dried by the application of heated air through a nozzle 17 (or series of nozzles), or in any other suitable way including ambient air-dry.

As illustrated, the pattern on the printing roller 15 comes out as a reverse pattern layer 11 to form the decalcomania. Note the mirror image of the word HUNTER, and reversal of the side geometric objects, which illustrates this proposition.

The printing of the decalcomania 10 including all four or more colors, with the printing roller 15 provides the reverse pattern layer 11 and the spaces 12 in perfect registration. The tedious process of making the multiple passes on a screen printing press, the application of colored film or other approaches that have been used in the past, are now no longer necessary. A high resolution pattern is provided ready to be applied directly to a sheet 20, as will be described with respect to FIG. 3.

The preferred form of the decalcomania 10 is a water-activated, slide-on type. Thus, as illustrated in FIG. 2, a wetting bath including a shallow pan 25 for holding a pool of water 26 is illustrated as representative of how this step is performed. The decalcomania 10 is lowered into the water 26 in a typical fashion, soaked and then pulled from the pan 25 so as to gently squeegee the excess water from the surfaces, as denoted by the action arrow in this figure. At this point of the method of the present invention, the substrate 16 and the pattern layer 11 are held together by the action of surface tension. The ink that forms the pattern layer 11 is insoluble in water so that it is maintained in tact during this preliminary step leading up to transfer to the sheet 20.

Figure 3:
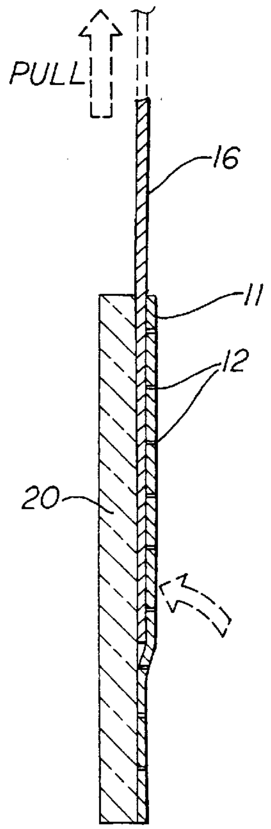
FIG. 3 is a side, cross sectional elevational view of the pattern layer of the decalcomania being actually applied to a sheet of glass by pulling the substrate out from under the pattern layer.

With reference now to FIG. 3, the sheet 20, which can be transparent (or translucent) is positioned to receive in face-to-face contact the substrate 16 of the decalcomania 10. To lay the pattern layer 11 onto the back of the sheet 20, one edge is held in registration, while the substrate is pulled clear, as noted by the dashed line action arrow. As the pattern layer 11 slides off of the substrate 16, it is gently placed in contact with the back of the sheet 20, as denoted by the curved action arrow in this figure.

As indicated above, the sheet 20 is preferably transparent, but can of course be translucent; and while the preferred embodiment of the sheet 20 is glass, within the broadest aspects of the present invention the sheet can be acrylic, or other suitable plastic composition.

In this preferred embodiment, the ink used in the multi-color printing operation of FIG. 1 is preferably a lacquer-based ink that is mixed with glass frit (powder-like particles). Of course, other oil based paint can be substituted as an equivalent. When the ink is dried by the blowers 17, or equivalent means, as shown in FIG. 1, the temperature is maintained low enough so that it is insufficient to melt the frit. Also, the frit that is used may include oxides in order to enhance the color of the various inks being applied.

Figure 4:
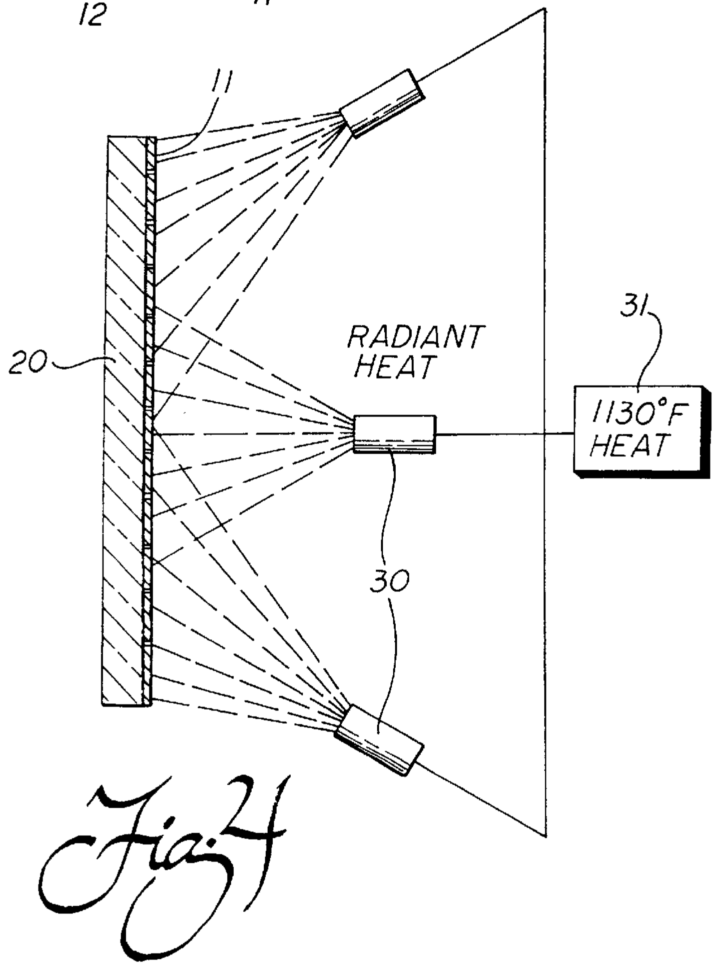
FIG. 4 is a schematic showing in side elevation representing the step of heating the pattern layer so as to fuse it into the back of the glass.

Assuming that the preferred embodiment of the method is being practiced utilizing glass as the sheet 20, once the pattern layer 11 is in position, then additional heat is applied to perform an important function of the invention. This is best illustrated in FIG. 4, where an array of radiant heaters 30 receiving heat from a source 31, is used to fix the pattern layer in position on the back. The heat is applied in the range of 1060° F.–1200° F., and preferably approximately 1130° F. At this temperature, the glass frit melts and fuses the pattern layer 11 of the multi-color ink to form a permanent design on the back of the transparent sheet 20. Preferably, the heat is applied in a kiln and is timed so as to provide the desired result of fusing the pattern layer 11 and the sheet 20 together. Unlike prior methods of forming decorative plaques, the interface between the pattern layer 11 and the sheet 20 is thus permanently fused together. In other words, as the glass frit melts, it is permanently attached and actually becomes a part of the backside of the sheet 20. In the instance where acrylic sheet is substituted, particles of plastic can be used and a lower, suitable temperature is imposed.

Figure 5:
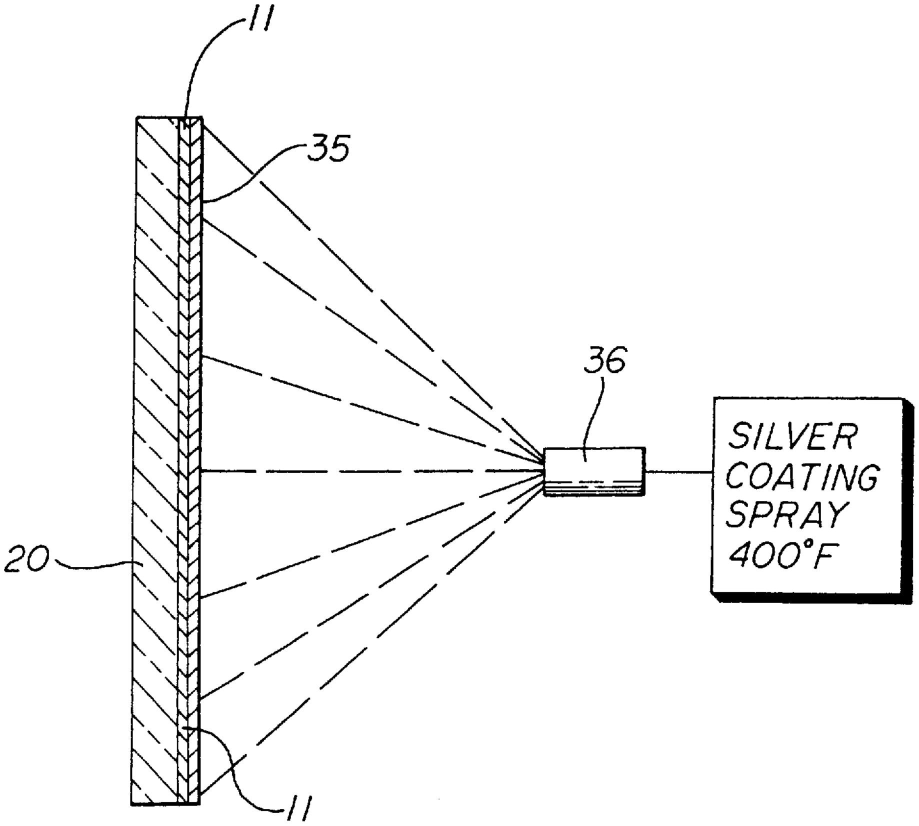
FIG. 5 is a side, schematic view of the next step in the method of coating the back of the pattern layer with a contrasting color, such as silver.

The next step is illustrated in FIG. 5 where a contrasting layer 35 is applied on the back of the now permanently attached pattern layer 11 on the sheet 20. Preferably, the contrasting layer 35 is sprayed through a nozzle 36 at an elevated, but at the relatively low temperature of approximately 400° F. In this manner, the layer 35 is also permanently attached on the back of the contrasting pattern layer 11. Thus, the preferred method is to spray, deposit or coat the entire back of the pattern layer 11. However, it is to be understood within the broadest aspects of the invention, that at least the open spaces in the pattern layer are to be covered in order to show through in the contrasting fashion from the front of the sheet 20. The heat being applied in the range of 350° F.–400° F. is not sufficient to remelt the glass frit in the pattern layer 11, so that now the pattern being shown through the front of the sheet is complete.

Figure 6:
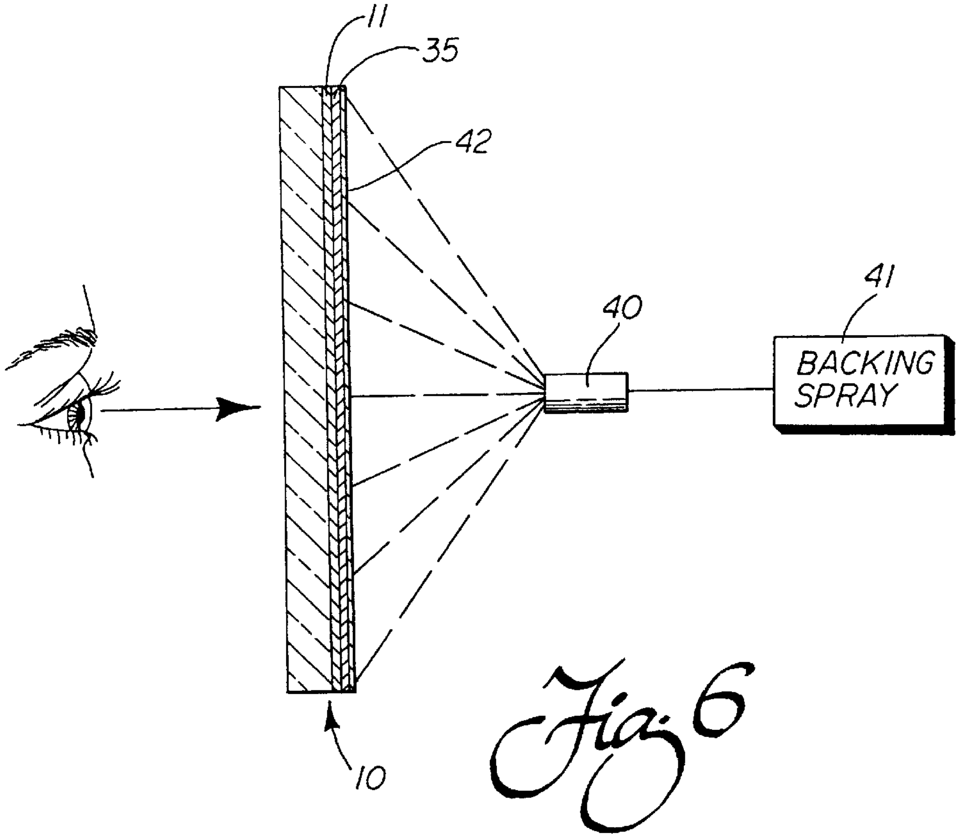
FIG. 6 is a side, schematic view illustrating the final step of providing a backing across the pattern layer and the contrasting layer and showing the direction of appropriate viewing of the final product.

As the next step, a nozzle 40 supplies another oil base paint from the source 41 in order to deposit a backing 42 that is hard and highly scratch resistant. With the completion of this step, it will be realized that the pattern layer 11 and the contrasting layer 35 are embedded within the now finished plaque P (see FIG. 7) and is fully protected from wear, or any other outside disturbance, such as by vandalism. From the front viewing position, as depicted in FIGS. 6 and 7, a high resolution decorative pattern is formed as a composite of the pattern layer 11 applied by the decalcomania 10, and enhanced by covering at least the open spaces 12 by the contrasting layer 35.

Figure 7:
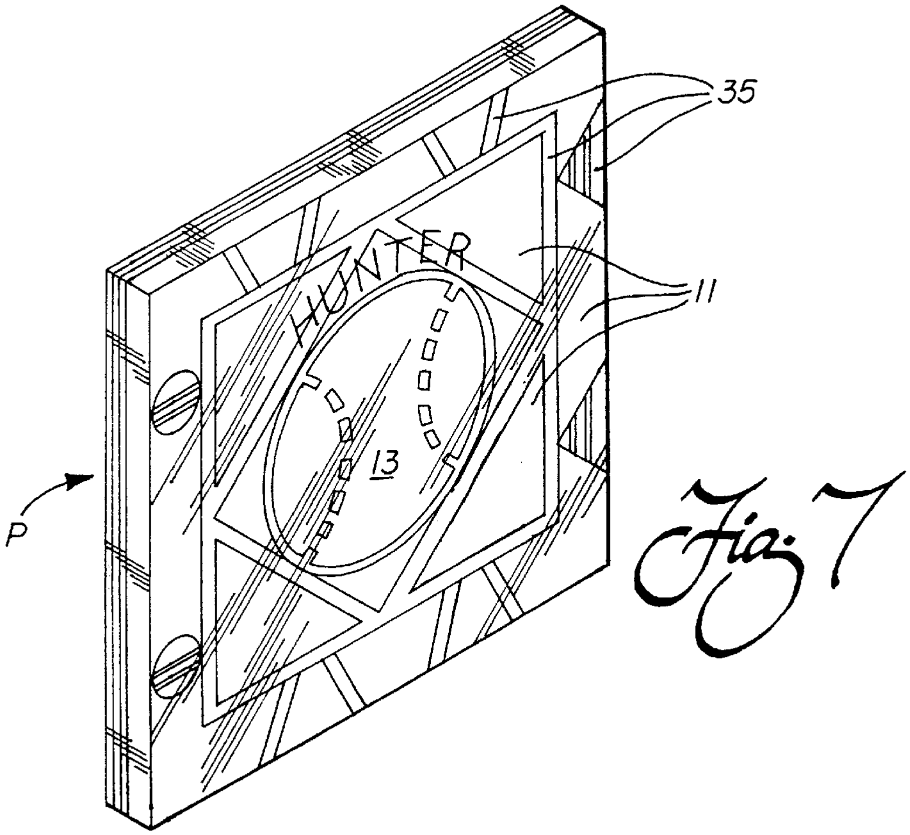
FIG. 7 is a perspective view of the finished product, such as a decorative plaque or mirror.

Thus, the plaque P, which can be viewed in its totality in FIG. 7 and method by which it is formed, provides results and advantages not heretofore found in the art. The high resolution of the total composite pattern of the layers 11 and 35 results in an attractive decorative plaque that has not been possible to attain. The registration which is accomplished by printing the decalcomania 10 in one simple, high speed color printing operation is virtually perfect. The contrasting layer 35 adds to the attractiveness of the overall plaque P. In the instance where the mirror version is used, the spaces 12 show through the contrasting layer 35 as reflective silvering, which adds an extra dimension of attractiveness to the product.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A method of forming a decorative plaque comprising the steps of:

providing a transparent sheet having a front and a back;

printing a decalcomania having a reverse pattern layer with open spaces;

applying the pattern layer of the decalcomania to the back of the transparent sheet for front viewing of the pattern; and depositing a contrasting layer behind said pattern layer to cover at least the open spaces to make said spaces distinctive and viewable from the front, whereby the decorative plaque may be economically formed and displaying a high resolution decorative pattern.

2. The method of forming a plaque of claim 1, wherein is provided in the printing step:

applying multi-color inks to a substrate of the decalcomania to make a multi-color pattern layer to be applied to the sheet.

3. The method of forming a plaque of claim 2, wherein prior to the printing step, mixing glass frit with the inks, and after the printing step drying the ink.

4. The method of forming a plaque of claim 3, wherein the fritted ink of the decalcomania is dried on the substrate at a low temperature that is insufficient to melt the frit in the ink.

5. The method of forming a plaque of claim 3, wherein after positioning the pattern layer in place on the sheet, applying heat between 1060° F. and 1200° F. in a kiln sufficient to melt the glass frit in the ink and fuse the pattern layer into the back of the sheet.

6. The method of forming a plaque of claim 5, wherein the heat is applied at approximately 1130° F.

7. The method of forming a plaque of claim 1, wherein prior to said applying step, the decalcomania including the substrate is wetted so as to allow the pattern layer to slide into position on said sheet, the ink being insoluble in the water to maintain the pattern layer in tact during transfer.

8. The method of forming a plaque of claim 7, wherein the deposition of the contrasting pattern layer is by spray coating to the back of said sheet at a temperature in a range of 350° F.–400° F. so as to attach to at least the open spaces in said pattern layer, but not remelt the glass frit in said pattern layer.

9. The method of forming a plaque of claim 1, wherein the deposition step is provided by spraying a liquid silver nitrate solution on the back of the open spaces to make said spaces reflective within said pattern; whereby a decorative mirror is formed.

10. The method of forming a plaque of claim 9, wherein the step of applying a backing includes spray painting the back of said pattern and reflective layers with a scratch resistant paint.

11. The method of forming a plaque of claim 1, further including the step of:

A applying a protective backing behind said contrasting layer.

12. A decorative plaque comprising:

a transparent sheet having a front and a back;

a reverse pattern layer with open spaces from a decalcomania on the back of said sheet for front viewing of the pattern; and a contrasting layer behind the pattern layer to cover at least the, open spaces to make said spaces distinctive and viewable from the front, whereby an economically formed decorative plaque displaying a high resolution decorative pattern is provided.

13. A decorative plaque of claim 12, wherein said pattern layer is formed of multi-color inks and said contrasting layer is formed of an ink of contrasting color.

14. The decorative plaque of claim 13, wherein the ink forming the pattern layer is fritted and upon mounting is fused into the back of the sheet.

15. The plaque of claim 12, wherein the contrasting layer is silver to form a decorative mirror.

16. The decorative plaque of claim 15, wherein a layer of scratch resistant paint is provided behind the layer of silver.

17. The decorative plaque of claim 12, further including:

a protective backing behind the contrasting layer.

* * * * *